United States Patent Office 2,901,450
Patented Aug. 25, 1959

2,901,450

FILM-FORMING AND DRYING COMPOSITIONS

Harry H. Beacham, Plainfield, N.J., assignor to National Lead Company, New York, N.Y., a corporation of New Jersey No Drawing. Application January 24, 1956
Serial No. 561,147

5 Claims. (Cl. 260—19)

This invention relates to film-forming and drying compositions of matter. More specifically, it relates to compositions which are capable of forming smooth and continuous durable films. Still more specifically this invention relates to quick-drying varnishes.

Many types of film-forming and drying compositions have been commercially produced and marketed for many years. Among these are paints, shellacs, varnishes, lacquers and enamels. Progress in the art of manufacturing of film-forming and drying compositions has, at least in one phase, been directed toward production of quicker-drying products. One method of accomplishing this has been to incorporate in these finishes quantities of "conjugated" (i.e. containing conjugated double bonds), quick-drying oils such as Chinawood, dehydrated castor, and oiticica. These quick-drying oils, however, while they may beneficially affect the drying time of the composition on which they are employed, possess the disadvantage of generally affecting the type of film produced. Wrinkled, frosted and gas-checked surfaces often result when quick-drying oils are employed in finishes and in order to overcome these disadvantages, other oils are often used in large amounts in conjunction with the quick-drying oils to provide an acceptable surface.

Another method for overcoming these disadvantages when using quick-drying oils is to employ resins in large quantities. However, when large amounts of resins are used in such compositions, the film produced is often brittle or "short" and therefore not flexible. When smooth and continuous films are desired, it has not been possible to employ quick-drying oils as the sole or major constituent of the oil portion of the vehicle and still avoid wrinkling and frosting unless resins are employed in large quantities with the quick-drying oil, which produces brittle films.

An object of this invention, therefore, is to provide an improved film-forming and drying composition. Another object is to provide a film-forming and drying composition capable of forming a quick air-drying hard protective coating which is not brittle. A further object is to provide a composition which utilizes a quick-drying oil and at the same time produces a smooth, flexible, continuous surface. Another object is to produce a film-forming and drying composition which employs a quick-drying oil without using a large quantity of resins. These and other objects will become apparent from the following more complete description of the instant invention.

In its broadest aspects this invention contemplates a film-forming and drying composition comprising a conjugated drying oil, a titanium ester and an oil soluble resin, said titanium ester being selected from the group consisting of alkyl titanate and alkoxytitanium acylates, said oil soluble resin being selected from the group consisting of phenolic resin, dehydrated castor oil modified alkyd resin, ester gum and rosin, said titanium ester being present in amount from about 2% to about 10% by weight of said composition and said composition containing one to six parts of oil for each part of resin employed.

In a particularly desirable embodiment, this invention contemplates a film-forming and drying composition of the above constituents in which the alkyl group in said alkyl titanate and the alkoxy and acylate of said titanium alkoxy acylates are saturated groups.

In order to carry out the instant invention, a fast drying conjugated drying oil is employed; such oils include tung or China-wood, dehydrated castor and oiticica oils. These conjugated oils are to be distinguished from non-drying oils having little or no unsaturation, semi-drying oils containing only one double bond in the molecule, or a plurality of double bonds arranged in unconjugated relation, and drying oils of the linseed oil type, wherein two unconjugated double bonds are capable of rearranging to a conjugated form. These various unconjugated oils either do not form drying films at all, or do not have any pronounced tendency to wrinkle. Linseed oil, for example, normally forms smooth unwrinkled films. When applied too heavily, or when subjected to excessive heat during drying, linseed oil films may, and sometimes do, wrinkle in drying. While the addition of titanium esters to such films may provide some additional protection against wrinkling, there is ordinarily no particular advantage in so doing, since the tendency to wrinkle is ordinarily not present when the ordinary proper application and drying techniques are employed.

Conjugated oils, on the other hand, containing conjugated double bonds, are by their chemical nature subject to rapid oxidation. This rapid oxidation apparently promotes skin-formation and wrinkling, and coating compositions based primarily on such oils invariably have a pronounced tendency to wrinkle or frost during drying, regardless of the mode of application or drying conditions. This tendency is particularly marked when surface drying catalysts, such as lead of cobalt naphthenates, are employed in the formulation.

As pointed out above, it is customary to use resins in the formulation. Use of resins does not alter the wrinkling tendency of conjugated oils except when used in large amounts to produce lacquer-like compositions. Nevertheless, it is preferred to include some resin in the formulation for the hardness and durability that is imparted to the film. Substantially any oil-soluble resin may be employed in the composition. Those particularly useful are dehydrated castor oil modified alkyds, phenolic resins other than phenyl ethers, and natural resins such as ester gum, rosin, etc. Many oleoresinous varnishes are currently on the market, some of which contain large amounts of quick-drying conjugated oils. Those containing the quick-drying oils may be employed in the instant invention. Also contemplated in the instant invention are varnishes in which the oil portion consists of more than 50% of one of the quick-drying oils in a mixture with another type of oil. It is particularly advantageous to have present for each part of resin in the composition from 1 to 6 parts of oil.

In order to form the film-forming and drying composition, it is necessary to employ a titanium ester. The term "titanium ester" as used in this specification includes both titanium orthoesters and alkoxytitanium acylates. The preparation of titanium orthoesters is described in the literature. Satisfactory results have been obtained using alkyl titanates prepared from alcohols containing from 2 to 20 carbon atoms in the alcohol group. Both unsubstituted alcohols and amine alcohols may be employed with equal results. The alkoxytitanium acylates, which are also considered to be titanium esters, may be prepared according to the method described in copending application Serial No. 349,559, filed April 17, 1953. In such compounds the alkoxy group contains 2 to 20 carbon atoms, and the acylate group is derived from an organic carboxylic acid containing no more than 2 carboxyl groups, said acylate group containing from 3 to 36 carbon atoms. The alkoxytitanium acylates also should contain from 1 to 3 alkoxy groups per titanium atom and from 1 to 3 carboxyl groups per titanium atom, the sum of the alkoxy and carboxyl groups being substantially equal to 4 per titanium atom. Both types of titanium esters may be employed with substantially identical results.

While both saturated and unsaturated esters of titanium are operable to some degree in producing non-wrinkled films, the unsaturated esters, such as the titanates of unsaturated alcohols or alkoxytitanium acylates containing unsaturated alkyl or acylate groups, are more reactive and not as easily controlled. When the ester employed is too reactive, the system tends to gel prematurely and therefore has poor storage stability. This tendency can usually be kept in check by the incorporation of large amounts of alcoholic solvents, but this is ordinarily undesirable, because the use of large amounts of alcohol or other solvents reduces the solids content of the formulation, reduces its tolerance to loading with pigments or fillers, and makes necessary the use of heavy initial applications or multiple applications to achieve a film of the desired thickness and properties. Moreover, the use of large amounts of alcohol or other volatile solvents is in itself uneconomical, since the solvents are lost to the atmosphere upon drying of the film. For these and other reasons, it is preferred to use only fully-saturated or substantially fully-saturated alkyl titanates or alkoxytitanium acylates. By "substantially fully-saturated" is meant compounds of high molecular weight having few unsaturations, e.g. polymerized alkoxytitanium methacrylates, wherein most of the unsaturations have been consumed in the polymerization process, although a few residual double bonds may remain.

In employing titanium esters in the film-forming and drying composition, satisfactory results have been obtained when from 2% to about 10% of the titanium ester is employed. If the titanium ester is added in amount substantially less than 2%, wrinkled and frosted surfaces will be obtained. If the titanium ester is added in amounts substantially above 10%, the film forming and drying composition will produce brittle and powdery surfaces which are undesirable. When the titanium ester is added in amount within the range of about 2% to about 10%, hard, continuous and smooth films are produced which are flexible and not brittle.

Films prepared according to the present invention also have the additional advantage of being applicable in relatively thick coats without tending to sag or creep over the substrate surface during drying, a tendency which is ordinarily exhibited by both conjugated and non-conjugated oils where applied in thick coats.

In order to more fully illustrate the process of the instant invention and the type of product obtained by such a process, the following examples are presented:

Example 1

A film-forming and drying composition was prepared by heat-blending 100 parts of an oil soluble phenol-formaldehyde resin (softening at about 100° C.) with 200 parts of pure China-wood oil, 1 part of lead naphthenate and 150 parts mineral spirits. To 100 parts of this mixture were added 13 parts of butanol and 6.6 parts of the monobutoxytitanium ester of triethanolamine to form a varnish. This varnish was applied with a 6 mil film applicator to a cold rolled steel panel and was dried for 30 minutes at 100° C. The dried film was smooth, transparent, continuous and impervious and possessed a uniform texture with a high gloss. It possessed a Sward rocker hardness of 16. The film was not brittle and withstood 30% distention on a Bell Telephone conical mandrel without breaking.

For comparison another portion of the varnish not containing the titanate was applied to a steel panel and dried under identical conditions. The dried film was badly wrinkled and gas checked.

Example 2

An alkyd varnish was prepared in the ordinary way from 50% dehydrated castor oil fatty acids and 35% phthalic anhydride and 15% glycerine. This solution was cut to 40% non-volatile in a mixture of equal parts xylol and butanol, and having an acid value of 50. To 100 parts of this varnish were added 2.5 parts of tetrabutyl titanate. The modified varnish was then spread onto a steel panel and allowed to dry. The dried film was transparent, smooth, continuous and flexible and after 24 hours had a Sward rocker hardness of 15.

The film was a high quality varnish finish in every respect.

Example 3

The alkyd varnish prepared from dehydrated castor oil as described in Example 2 was modified as follows: 100 parts of the untitanated varnish were mixed with 22 parts of a butyl alcohol and 6.6 parts of tributoxytitanium monostearate. This modified varnish was then spread onto a steel panel and air dried for 24 hours. The dried film was transparent, continuous, glossy and flexible and had a Sward rocker hardness of 30.

In order to compare this modified varnish with the same varnish containing no titanium ester, a portion of the varnish before the addition of the titanium ester was also spread onto a glass plate and allowed to dry. The dried film was badly wrinkled and was not adherent.

Example 4

A varnish was prepared by mixing 100 parts of an oil soluble tert butylphenol-formaldehyde resin (softening at 60–75° C. and having an acid number less than 12), 200 parts oiticica oil, 150 parts of xylol and 150 parts of naphtha. 100 parts of this varnish were modified by mixing therewith 6 parts of butyl titanate. The modified varnish was spread onto a steel panel. The dried film formed was transparent, continuous and flexible and had a Sward rocker hardness of 9 after 4 hours' air drying. After 24 hours air drying, the hardness was increased to 26.

The varnish before modification with the titanium ester was spread onto a panel and air dried. This film possessed a frosty and wrinkled surface.

Example 5

A varnish was prepared from 100 parts of ester gum, 240 parts China-wood oil, 80 parts of linseed oil and 400 parts of mineral spirits. 100 parts of this varnish were modified by adding 5 parts tributoxytitanium monolaurate. The modified varnish was spread onto a panel and allowed to air dry. The film was clear, smooth glossy and flexible.

Example 6

A varnish was prepared by mixing 100 parts of a liquid oil soluble resorcinol-formaldehyde resin with 100 parts of China-wood oil, 1 part of lead naphthenate and 150 parts of mineral spirits. To 100 parts of this mixture were added 13 parts of butanol and 6.16 parts of monobutoxytitanium ester of triethanolamine to form a varnish. This varnish was applied to a cold rolled steel panel and the dried film was smooth, transparent, continuous and impervious and possessed a uniform texture with a high gloss.

From the above description and by the examples presented it has clearly been shown that smooth, continuous, and flexible films may be produced from film-forming and drying compositions which employ quick-drying oils. These smooth films may be produced without increasing the quantity of resin in the composition. The film-forming and drying compositions in the instant invention are relatively quick-drying and form hard surfaces which at the same time are not brittle. These films are flexible and are "level drying," by which is meant that they dry to a smooth, even surface and do not wrinkle, gas check or form frosted surfaces. By the instant invention, flexible, smooth and continuous surfaces are produced from compositions which contain large percentages of quick-drying oils.

This application is a continuation-in-part of abandoned application Serial No. 349,559, filed April 17, 1953.

While this invention has been described and illustrated by the examples shown, it is not intended to be strictly limited thereto and other modifications and variations may be employed within the scope of the following claims.

I claim:

1. A film-forming and drying composition comprising a conjugated drying oil, a titanium ester and an oil soluble resin, said titanium ester being selected from the group consisting of a lower alkyl titanate and a lower alkoxytitanium alkanoate, the lower alkyl group in said alkyl titanate being a monovalent, unsubstituted, saturated hydrocarbon group and the alkanoate group containing from 3 to 18 carbon atoms, said oil soluble resin being selected from the group consisting of phenol-formaldehyde resin and dehydrated castor oil modified alkyd resin, said titanium ester being present in amount from about 2% to about 10% by weight of said composition and said composition containing from one to six parts of oil for each part of resin employed.

2. Composition according to claim 1 in which said titanium ester is butyl titanate.

3. Composition according to claim 1 in which said conjugated drying oil is China-wood oil.

4. Composition according to claim 1 in which said conjugated drying oil is oiticica oil.

5. Composition according to claim 1 in which said conjugated drying oil is dehydrated castor oil.

References Cited in the file of this patent

Kraitzer et al.: "Jour. Oil Colour Chem. Assoc." 31 (1948), 405–447. Bureau of Standards Library.